United States Patent
Endo (10) Patent No.: US 6,453,351 B1
(45) Date of Patent: *Sep. 17, 2002

(54) TRAFFIC CONTROL METHOD AND NETWORK CONTROL SYSTEM

(75) Inventor: Noboru Endo, Kodaira (JP)

(73) Assignee: Hitachi, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/305,188

(22) Filed: Sep. 13, 1994

(30) Foreign Application Priority Data

Sep. 13, 1993 (JP) ............................................. 5-226855

(51) Int. Cl.⁷ ............................................. G06F 15/16
(52) U.S. Cl. ........................................ 709/229; 370/232
(58) Field of Search ................................ 395/800, 200, 395/200.12, 200.13; 370/94.1, 17, 60, 16, 229, 230, 232, 234; 709/227–229; 364/715.01

(56) References Cited

U.S. PATENT DOCUMENTS

| | | | | |
|---|---|---|---|---|
| 4,905,233 A | * | 2/1990 | Cain et al. | 370/94.1 |
| 5,166,894 A | * | 11/1992 | Saito | 364/715.01 |
| 5,179,549 A | * | 1/1993 | Joos et al. | 370/17 |
| 5,267,232 A | * | 11/1993 | Katsube et al. | 370/17 |
| 5,274,625 A | * | 12/1993 | Derby et al. | 370/17 |
| 5,274,643 A | * | 12/1993 | Fisk | 370/94.1 |
| 5,282,203 A | * | 1/1994 | Oouchi | 370/94.1 |
| 5,317,562 A | * | 5/1994 | Nardin et al. | 370/16 |
| 5,335,222 A | * | 8/1994 | Kamoi et al. | 370/60 |
| 5,359,593 A | * | 10/1994 | Derby et al. | 370/17 |
| 5,561,771 A | * | 10/1996 | Harrison, Jr. et al. | 395/200.13 |
| 5,594,717 A | * | 1/1997 | Watanabe et al. | 370/232 |

FOREIGN PATENT DOCUMENTS

| | | |
|---|---|---|
| JP | 4044440 | 2/1991 |
| JP | 3106148 | 5/1991 |
| JP | 3-106148 | 5/1991 |
| JP | 4109730 | 4/1992 |

OTHER PUBLICATIONS

The Bell System Technical Journal, "Stochastic Theory of a Data–Handling System with Multiple Sources" by D.Anick, et al., Oct. 1982, vol. 61, No. 8.

IEEE Transactions on Communication Technology, "Buffer Behavior For Batch Poisson Arrivals and Single Constant Output" by W.W. Chu, vol. Com–18, No. 5, Oct. 1970.

* cited by examiner

Primary Examiner—John A. Follansbee
(74) Attorney, Agent, or Firm—Antonelli, Terry, Stout & Kraus, LLP (57) ABSTRACT

A traffic control method and apparatus for simplifying declaration of a traffic parameter and improving the utilization rate of a network having a plurality of nodes. Each of the nodes monitors a queuing delay of a cell and periodically sends a monitoring result to a network management system. The network management system stores monitoring results in a data base, estimates an average cell rate and peak cell rate by using delay information in a route, a declared peak cell rate, and the maximum data frame length obtained from the data base, decides whether to accept connection set-up, and generates a policing parameter when new connection set-up request is sent through a terminal. Each of the nodes monitors the peak cell rate and average cell rate for each connection. If an average cell rate monitoring result is extremely different from the above policing parameter request to the network management system. The network management system estimates an average cell rate again by using the database to update policing parameters.

6 Claims, 12 Drawing Sheets

TRAFFIC CONTROL METHOD AND NETWORK CONTROL SYSTEM

BACKGROUND OF THE INVENTION

The present invention relates to a network control. system for a network. More particularly the present invention relates to a traffic control system method and therfore for an ATM network for estimating an average cell rate of data traffic and deciding admission of a connection set-up request in the network based on the estimated average cell rate.

When a user (terminal unit) requests set-up of a connection in a network being operated in an asynchronous transfer mode (ATM), the terminal unit must declare traffic characteristics of the network to the network side. In this case, it is recommended by ITU-T to use a peak cell rate as a traffic descriptor.

For service of a connection in which traffic content greatly fluctuates with time like data communication, however, it is impossible to effectively use network resources, particularly the link capacity by the above control method using only a peak cell rate as a traffic descriptor.

To solve the above problem, Japanese Patent Laid-Open No. 3-106148 discloses a control method for adding an average cell rate of data traffic in a connection requesting set-up as a traffic descriptor, calculating a bandwidth required by the connection by using a declared peak cell rate and average cell rate, and deciding whether to accept the connection in accordance with the bandwidth. This control method makes it possible to accept a new connection even if the sum of the peak cell rate of a newly declared connection and the peak cell rate of connections already accepted exceeds the bandwidth. In this case, it is proposed that the bandwidth can effectively be used by multiplexing connections statistically.

However, it is difficult to accurately estimate generated traffic characteristics depending on the type of communication service. Therefore, it is difficult to make every connection requiring set-up and declared prior to set-up and average cell rate of data traffic. For example, in the case of data communication using window control for the flow control between terminals, an average cell rate of data traffic depends on the round trip delay in a network.

Figure 2:
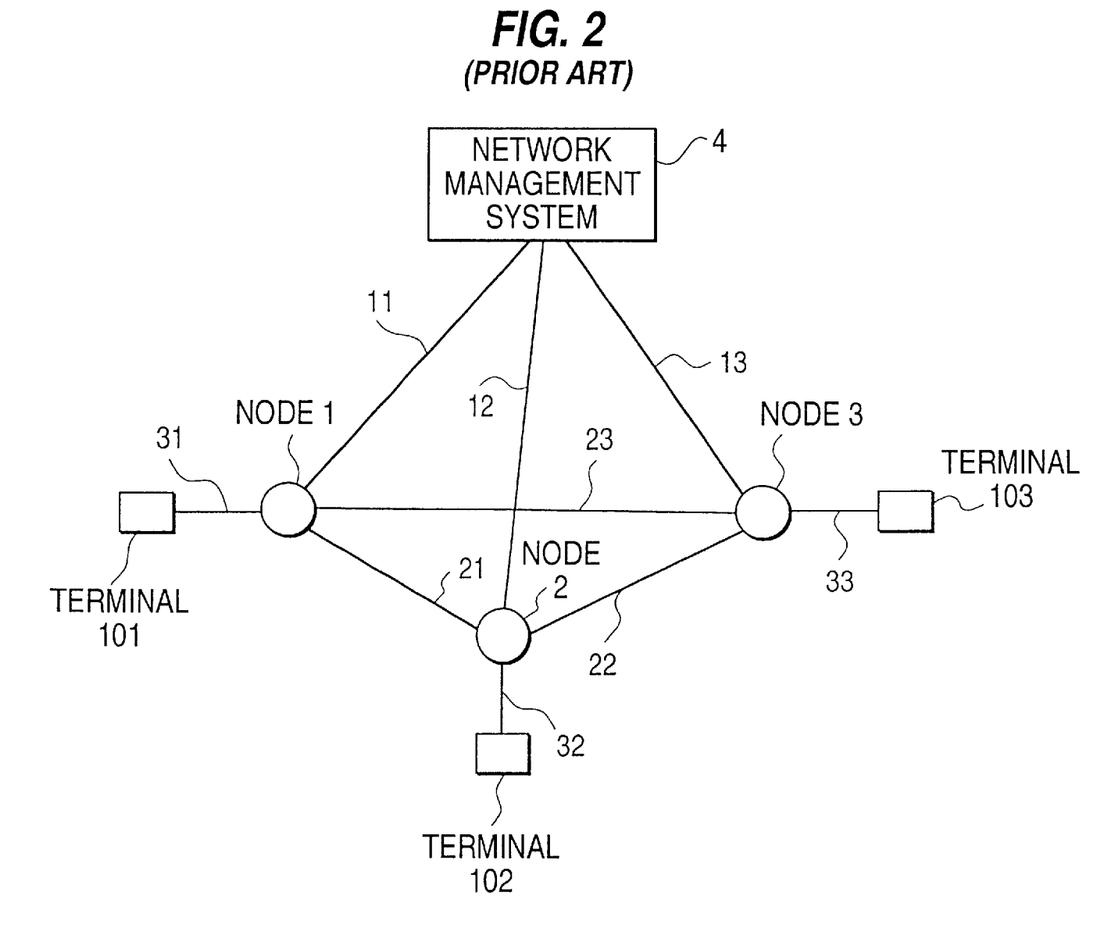
FIG. 2 is an illustration showing an example of the communication network to which the present invention is applied.

This is described below by taking the network shown in FIG. 2 as an example. FIG. 2 shows an ATM network, in which numerals 1, 2, and 3 represent nodes for performing ATM switching, 4 represents a network management system, 11, 12, and 13 represent links for network management, 21, 22, and 23 represent links between nodes, 31, 32, and 33 represent subscriber links, and 101, 102, and 103 represent terminals.

In this case, it is assumed that the terminal 101 transfers a data frame to the terminal 103 through the node 1, link 23, and node 3. The terminal 101 segments the data frame into multiple fixed-length packets (ATM cells) and sends them out to the subscriber link 31. The sent-out ATM cells arrive at the destination terminal 103 through the node 1, link 23, and node 3. The destination terminal 103 reassembles the original data frame by using the received ATM cells, checks if the data frame is correctly received, and generates a response frame. The response frame is segmented into multiple cells and sent to the source terminal 101 of the data frame through the node 3, terminal 23, and node 1. The source terminal 101 reassembles a response frame by using these received cells. When reassembling of the frame ends, the terminal 101 starts transmission of the next data frame.

In this case, an average cell rate of data traffic transmitted by the terminal 101 is given as a quotient obtained by dividing the information content included in one data frame by the time (round trip delay) until the next data frame is transmitted after above data frame is transmitted. The quotient depends on the route on a connection and the delay in a node.

A terminal unit cannot know a route through which a connection requested by the terminal unit is connected to a destination unit. Therefore, if declaration of an average cell rate of transmission data is indispensable, the terminal unit cannot help assuming the worst route and also a node delay time. generated in the fluctuation range of a network load and declare the maximum average cell rate within the range in order to secure the quality of service including the cell loss ratio and cell transfer delay. Thus, problems occur that an average cell rate of data traffic actually obtained in a network is substantially less than an average cell rate declared by the terminal unit. Thus, utilization efficiency of network resources decreases substantiallly if bandwidth allocation is performed in accordance with the declared average cell rate.

SUMMARY OF THE INVENTION

It is an object of the present invention to provide a traffic control method for improving the utilization efficiency of network resources.

It is another object of the present invention to provide a network control system for decreasing the load of a user terminal when setting up a connection.

It is yet another object of the present invention to provide a traffic control method for an ATM network for estimating an average cell rate of data traffic and deciding admission of a connection set-up request in the network based on the estimated average cell rate.

To achieve the above objects, the present invention estimates an average cell rate of data traffic for a connection at the network side in accordance with a traffic descriptor declared through a subscriber terminal in case of a connection set-up request. More concretely, the present invention accurately estimates an average cell rate of data traffic for each connection in accordance with a traffic descriptor declared by a user and database information of a management system at the network side and decides whether to set up connections in accordance with the estimated result.

The present invention makes it possible to accurately obtain an average cell rate by considering the load state of a network and effectively use network resources in accordance with bandwidth allocation corresponding to the utilization condition of a network because a network-side system estimates an average cell rate of each connection. Moreover, because a user terminal does not have to declare the value of a complicated ambiguous average cell rate as a traffic descriptor in case of a connection set-up request, the declaration procedure is simplified.

BRIEF DESCRIPTION OF THE DRAWINGS

The present invention will be more apparent from the following detailed description, when taken in conjunction with the accompanying drawings, in which.

DETAILED DESCRIPTION OF THE PREFERRED EMBODIMENTS

Figure 1:
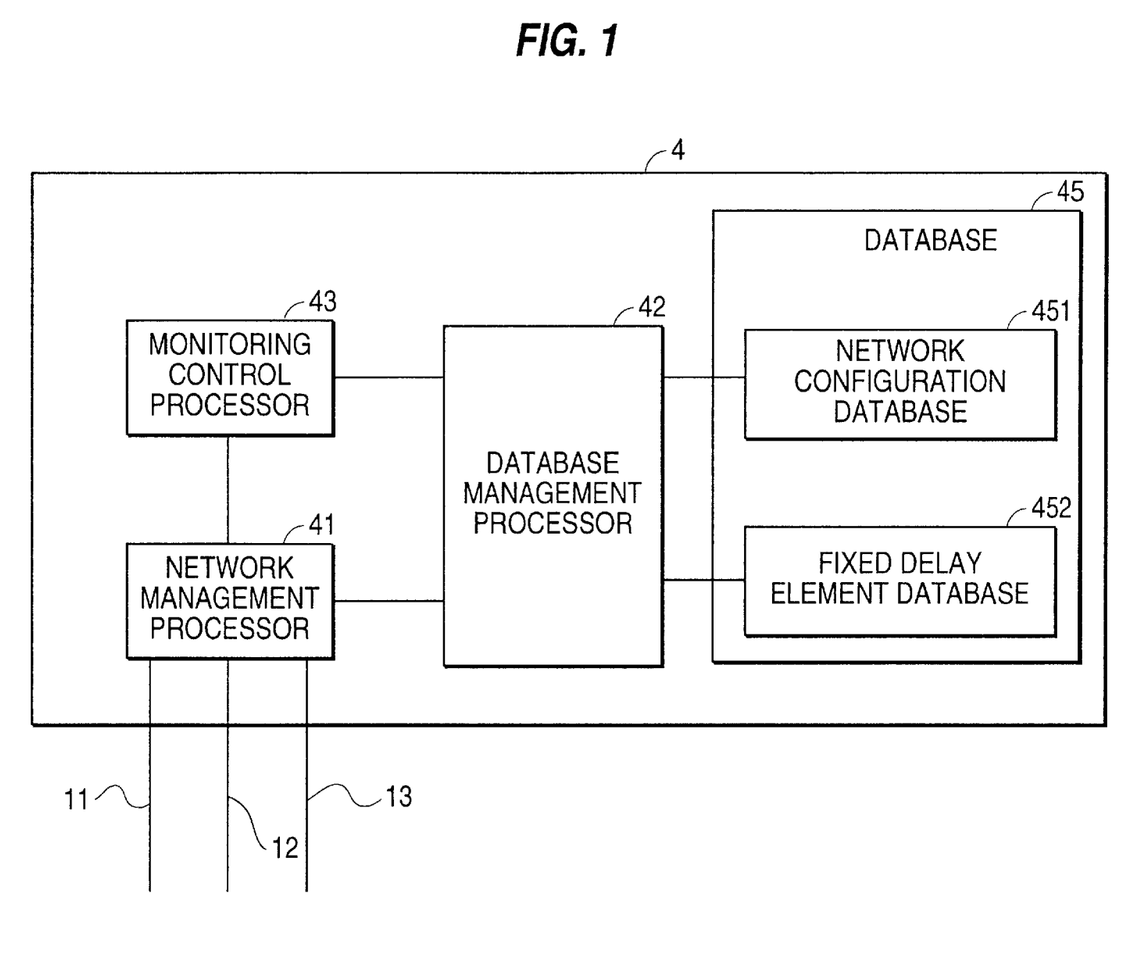
FIG. 1 is a block diagram showing the network management system of the first embodiment of the present invention.

FIG. 1 shows an embodiment of the network management system 4 of the present invention.

The network management system 4 comprises a network management processor 41, a database management processor 42, a monitoring control processor 43, and a database 45. The database 45 includes a network configuration database 451 and a fixed delay element database 452.

The network configuration database 451 stores the information for a node constituting a network and for a connective relation and connective state between a link and a terminal. The fixed delay element database 452 stores information for a node constituting a network and the value of a delay element contributing to a delay between terminals of a link but not depending on a traffic content. For example, the value of a fixed switching delay is stored in the case of a node and the values of a propagation delay and a link capacity are stored in the case of a link.

Figure 3:
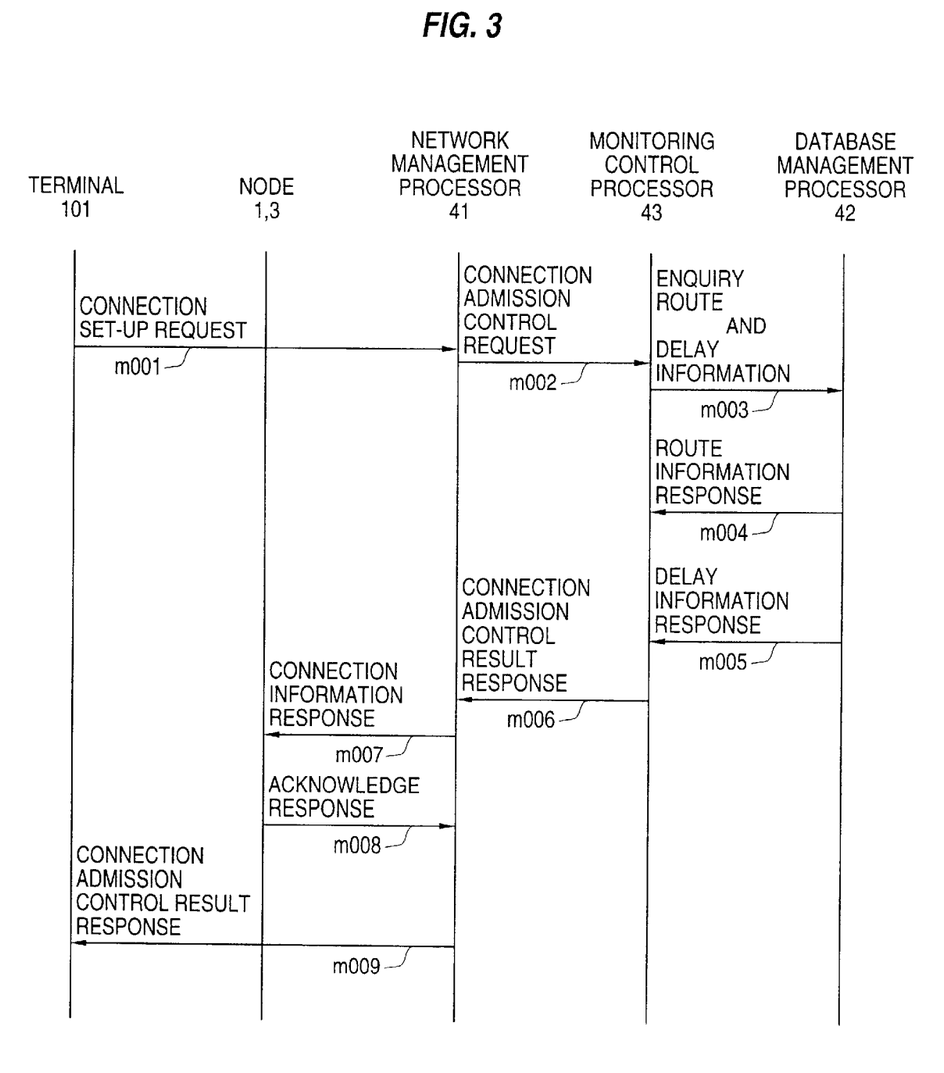
FIG. 3 is an illustration for explaining the connection set-up request acceptance control procedure in the first embodiment.

An operation procedure of the traffic control method of the present invention is described below by taking a case in setting up a communication connection between the terminals 101 and 103 in the network shown in FIG. 2 as an example and referring to FIG. 3.

For this embodiment, a user (terminal 101) declares the type and value of a traffic descriptor to the network management system 4 when requesting connection set-up for data communication with the terminal 103.

The following two types of traffic descriptors are prepared: "descriptor specification" and "service specification". When the user selects "descriptor specification" as the type of traffic descriptor, he declares the peak cell rate and the maximum data frame length converted into the number of cells as a traffic descriptor. When the user selects "service specification" as the type of traffic descriptor, he selects one of the services previously specified by the network side and declares it as a traffic descriptor.

In the network management system 4, the network management processor 41 has a table showing the relation between type of service, peak cell rate, and maximum data frame length converted into the number of cells. Therefore, when the processor 41 receives a connection set-up request message "m001" from the terminal 101, it checks the type of traffic descriptor included in the connection request message. If the type represents "service specification", the processor 41 refers to the table to obtain the peak cell rate corresponding to the type of service included in the connection request message "m001" and the maximum data frame length converted into the number of cells and handle them as traffic descriptors declared by the user. When the type of traffic descriptor represents "descriptor specification", the processor 41 directly uses the traffic descriptor included in the connection request message "m001".

The network management processor 41 sends a connection set-up decision request message "m002" including the declared traffic descriptor to the monitoring control processor 43. The monitoring control processor 43 sends, a message "m003" to the database management processor 42 requesting a search for a candidate route for connecting the terminal 101 and the terminal 103 and for delay information indicating delays in the route. The database management processor 42 receiving the message "m003" first searches for a candidate route for connecting the terminal 101 and the terminal 103 through the network configuration database 451 and sends a search result to the monitoring control processor 43 as a route information message "m004". In the case of the network in FIG. 2, a first route passing through the node 1, link 21, node 2, link 22, and node 3 and a second route passing through the node 1, link 23, and node 3 are sent. Then, the database management processor 42 searches for delay information indicating delay in the nodes and links on each route using the fixed delay element database 452 and sends a search result to the monitoring control processor 43 as a delay information response message "m005". The monitoring control processor 43 computes an estimated value of average cell rate by using the delay information received from the database management processor 42 and the declared traffic descriptor received from the network management processor 41.

A method for estimating an average cell rate by the monitoring control processor 43 is described below by taking a case in which the terminal 101 in the network configuration in FIG. 2 transfers a data frame to the terminal 103 by using a route comprising the node 1, link 23, and node 3 as an example.

In this case, it is assumed that the signal propagation delay of the subscriber link 31 connecting the terminal 101 and the network is d1, the fixed delay due to the switching at the node 1 is d2, the signal propagation delay of the link 23 is d3, the fixed delay due to the switching at the node 3 is d4, the signal propagation delay of the subscriber link 33 for connecting the destination terminal 103 and the network is d5, the peak cell rate declared as a descriptor is r1, and the maximum data frame length is L.

The estimated value d0 of round trip delay is assumed as "$L/r1+(d1+d2+d3+d4+d5)*2$". Moreover, the quotient $L/d0$ is obtained by dividing the declared maximum data frame length L by the estimated value d0 of round trip delay as an "estimated value of average cell rate".

For the above estimation method, because the queuing delay in a network, the delay time at a terminal, or the transmission time of a response frame are not considered, the estimated value of round trip delay gets smaller than an actually generated delay. Therefore, the estimated average cell rate gets larger than the average value of actual data transmission rate in the network. This is the estimation having a value at the safety side and a desirable result in view of traffic admission control. When the distance between transmitting and receiving terminals is large enough and the traffic load of a network is small enough, actual queuing delay, terminal-side delay time, and response-frame transmission time are small enough compared with the delay time in a network estimated in this embodiment. Therefore, it is estimated that there is not a very large influence of estimation error.

The monitoring control processor 43 selects an admission route in accordance with the above estimated value of average cell rate and declared peak cell rate. If an acceptable route is present, the processor 43 sends a connection admission control request "m006" including a value obtained by multiplying the above estimated value of average cell rate by a safety margin as a descriptor for monitoring to the average cell rate of the connection to the network management processor 41.

The network management processor 41 transmits a connection information response "m007" to each node on the route. In this case, the processor 41 sends the declared maximum cell rate and the estimated value of average cell rate to the node 1 connecting with the transmission terminal 101 as descriptors for monitoring the bandwidth utilization. When the network management processor 41 receives a response message "m008" showing that connection information is stored from each node on the route, it transmits a connection admission control result response message "m009" to the terminal 101 to permit a connection set-up request. If the requested connection cannot be set up, the processor 41 sends a message m009 for refusing the connection set-up request to the terminal 101.

Figure 4:
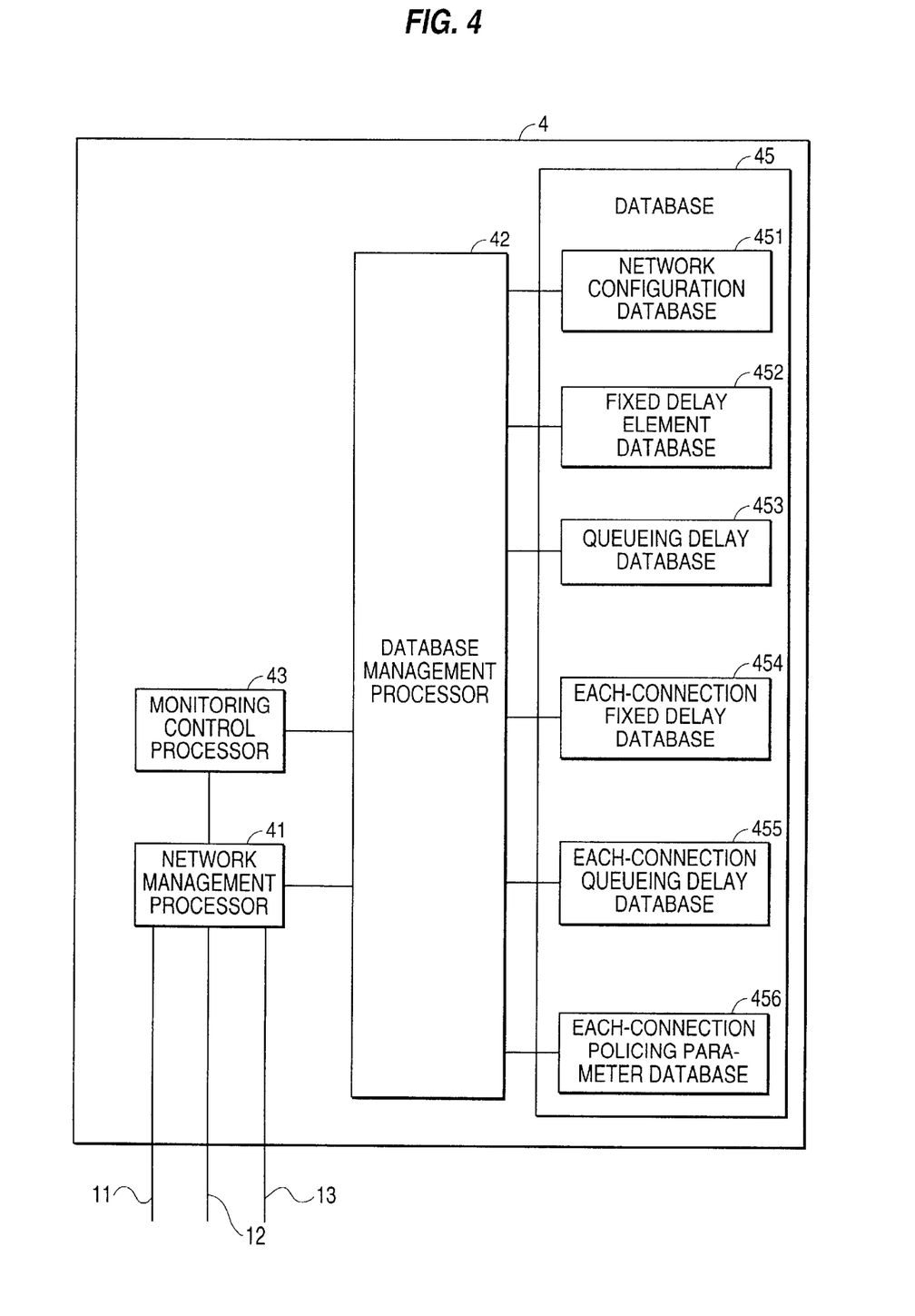
FIG. 4 is a block diagram showing the network management system of the second embodiment of the present invention.

FIG. 4 shows the second embodiment of the network management system 4. In the second embodiment, the network management system 4 comprises a network management processor 41, a database management processor 42, a monitoring control processor 43, and a database. 45, and the database 45 includes a network configuration database 451, a fixed delay element database 452, a queuing delay database 453, an each-connection fixed delay element database 454 having information of each connection, an each-connection queuing delay database 455 having information for each connection, and an each-connection monitoring descriptor database 456 having information for each connection. The queuing delay database 453 stores queuing delay information periodically sent from each node.

Figure 5:
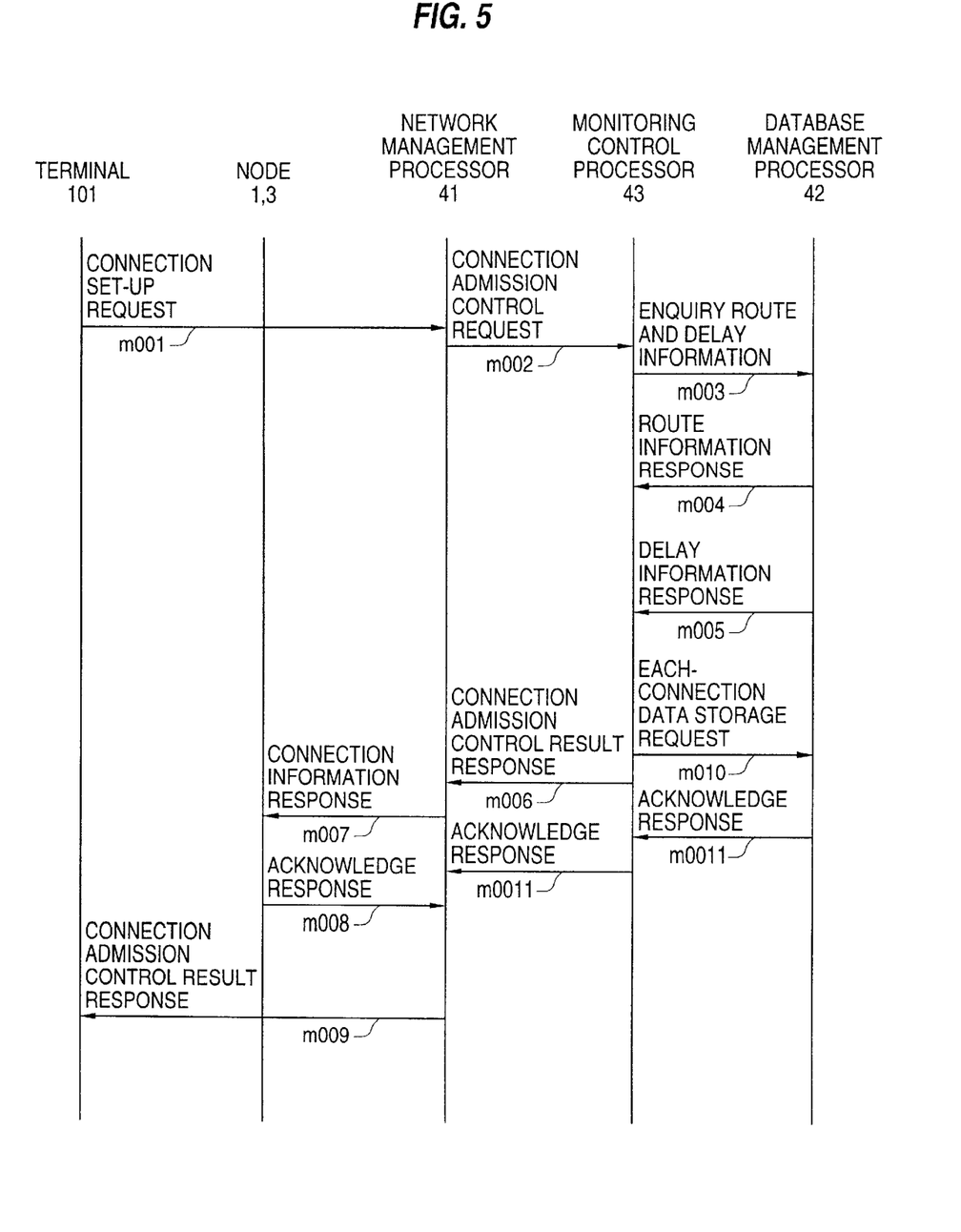
FIG. 5 is an illustration for explaining the connection set-up acceptance procedure in the second embodiment.

The traffic control procedure of the second embodiment is described below by taking a case in setting a communication connection between the terminals 101 and 103 in the network in FIG. 2 as an example and referring to FIG. 5.

When the network management processor 41 of the network management system 4 receives the connection set-up request message "m001" from the terminal 101, it sends the connection set-up decision request message "m002" including a declared traffic descriptor to the monitoring control processor 43.

The monitoring control processor 43 sends a message "m003" for requesting the search for a candidate route for connecting the terminal 101 and the terminal 103 and for delay information indicating delay in each route to the database management processor 42.

The database management processor 42 receiving the above request searches a route for connecting the terminal 101 and the terminal 103 by using the network configuration database 451 and sends the route information message "m004" providing a search result to the monitoring control processor 43. The database management processor 42 searches nodes on each route and link delay information by using the fixed delay element database 452 and the latest observed value of queuing delay on each route by using the queuing delay database 453, and sends the delay information response message "m005" generated in accordance with these search results to the monitoring control processor 43.

The monitoring control processor 43 computes the estimated value of average cell rate by using the delay information received from the database management processor 42 and the declared traffic descriptor received from the network management processor 41.

A method for estimating an average cell rate by the monitoring control processor 43 is described below by taking a route in which the terminal 101 in the network in FIG. 2 transfers a data frame to the terminal 103 through the node 1, link 23, and node 3 as an example. In this case, it is assumed that the propagation delay of the subscriber link 31 is d1, the fixed delay due to switching of the node 1 is d2, the queuing delay from the node 1 to the link 23 is q1, the propagation delay of the link 23 is d3, the fixed delay due to switching of the node 3 is d4, the queuing delay from the node 1 to the subscriber link 33 is q2, the propagation delay of the subscriber link 33 is d5, the queuing delay from the node 3 to the link 23 is q3, the queuing delay form the node 3 to the link 31 is q4, the declared peak cell rate is r1, and the maximum data frame length is L. The estimated value do of round trip delay is assumed as "L/r1+(d1+d2+d3+d4+d5) *2+q1+q2+q3+q4".

The quotient L/d0 is obtained by dividing the declared maximum data frame length L by the estimated value do of round trip delay as an "estimated value of average cell rate".

Also for this embodiment, a delay time and a response-frame transmission time at a terminal are not considered. Therefore, the estimated value of round trip delay gets smaller than an actual delay value and the estimated value of average cell rate gets larger than an actual value.

When the distance between transmitting and receiving terminals is large enough, a delay time and a response-frame transmission time actually generated at the terminal side are small enough compared with the delay time in the network considered for this embodiment. Therefore, it is estimated that there is not a very large influence of estimation error. When the distance between transmitting and receiving terminals is small, it is possible to greatly decrease the estimation error by, for example, adding a delay time and response-frame length of a terminal to a declared-value descriptor as an option and using them for estimation of a round trip delay.

The monitoring control processor 43 selects an acceptance route in accordance with the above estimated value of average cell rate and the above declared peak cell rate. If any acceptable route is present, the processor 43 uses a value obtained by multiplying the above average cell rate by a safety margin as an average cell rate monitoring descriptor of the connection.

Moreover, the processor 43 sends the fixed delay data of the connection to the each-connection fixed delay database 454, the queuing delay data of it to the each-connection queuing delay database 455, and a request message "m010" of it for storing a monitoring descriptor in the each-connection monitoring descriptor database 456 to the database management processor 42, and moreover sends the connection admission control result message "m006" to the network management processor 41.

The network management processor 41 transmits the connection information response "m007" including connection set-up information to each node on the route. In this case, the processor 41 sends the declared maximum cell rate and the estimated value of average cell rate to the node 1 connecting with the source terminal 101 for a connection set-up request as bandwidth utilization monitoring descriptors. When the network management processor 41 receives the response message "m008" for confirming if data is stored from the database management processor 42 through the monitoring control processor 43, it sends the message "m009" showing a connection admission control result to the terminal 101 to permit a connection set-up request. If the processor 41 cannot accept the connection set-up request, it sends the connection admission control result response message "m009" for refusing connection set-up to the terminal 101.

Figure 6:
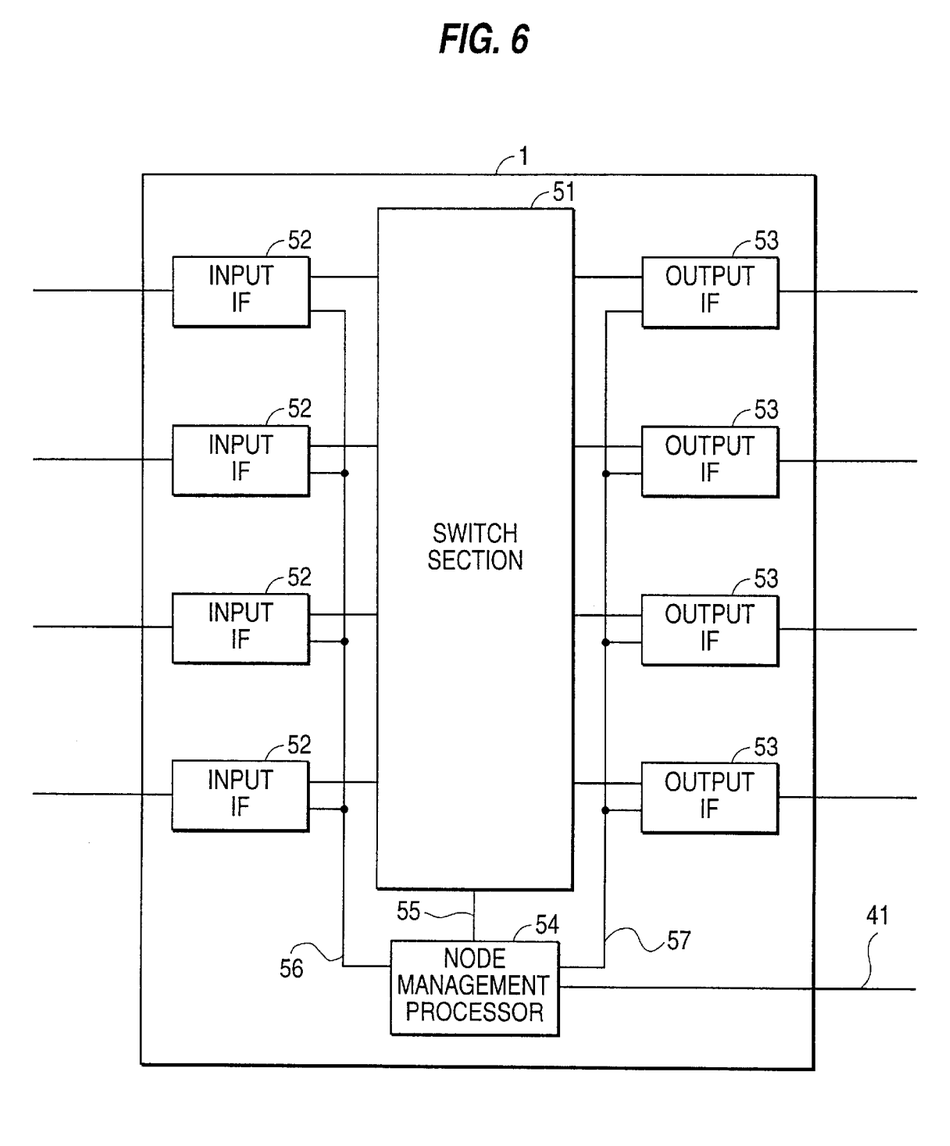
FIG. 6 is a block diagram showing an example of the ATM switching node 1.

FIG. 6 shows an example of the construction of the node 1 (or 3). In FIG. 6, numeral 51 represents a switch section, 52 represents an input interface (input. IF), 53 represents an output interface (output IF), 54 represents a node management processor, 55 represents a communication link for connecting the switch section 51 and the node management processor 54, 56 represents a communication link for connecting the input IF 52 and the node management processor 54, and 57 represents a communication link for connecting the output IF 53 and the node management processor 54.

An ATM cell inputted to the node 1 is provided with a reception processing by an input IF and thereafter inputted to the switch section 51, relayed and switched to an output IF corresponding to a destination output link, and provided with a transmission processing by an output IF, and then sent out to a subsequent node or link.

The node management processor 54 is used for call control, which monitors the states of the switch section 51, input IF 52, and output IF 53 through communication links 55, 56, and 57 to control these elements.

Figure 7:
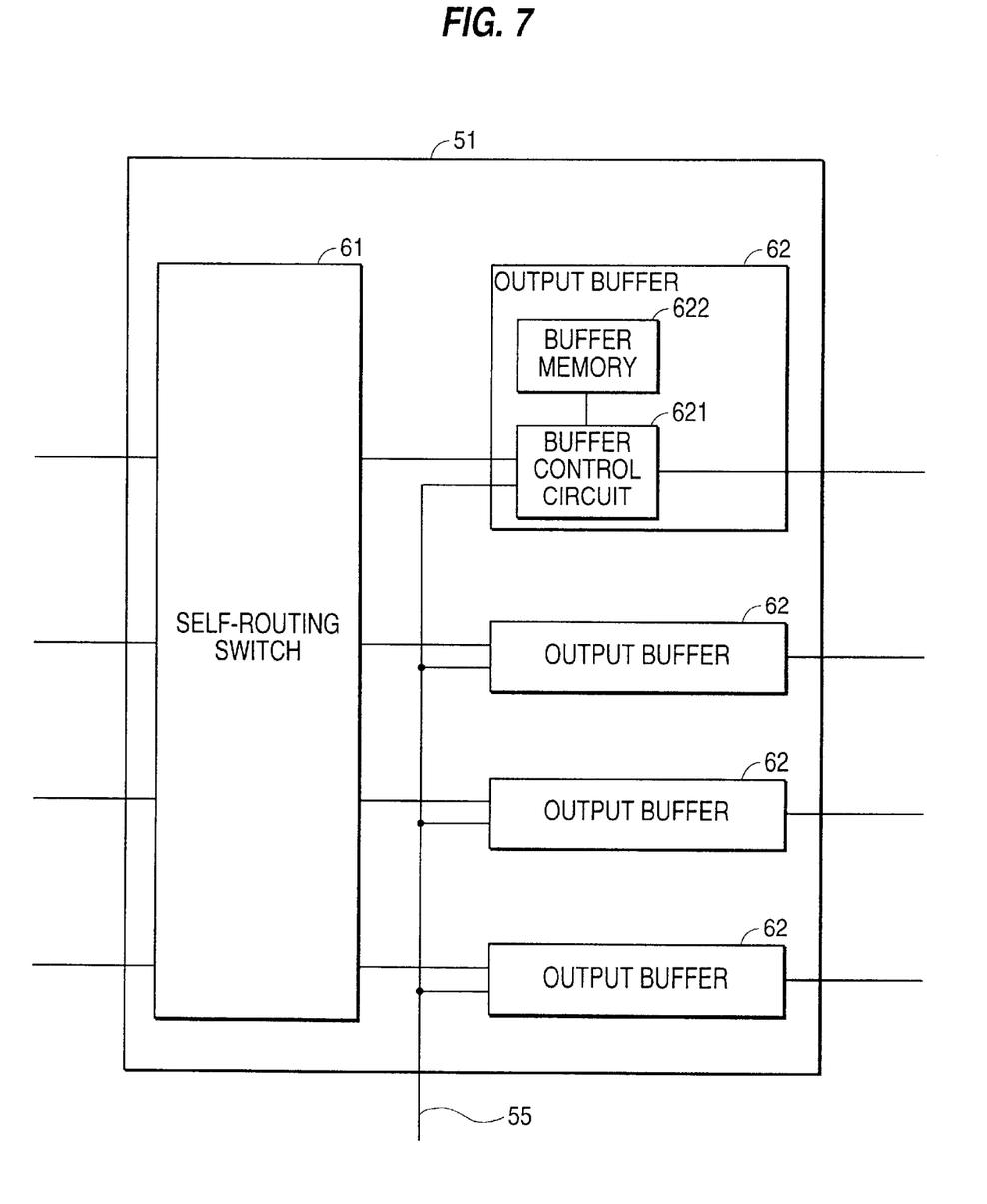
FIG. 7 is a block diagram showing an example of the switch section 51.

FIG. 7 shows an example of the construction of the switch section 51. In FIG. 7, numeral 61 represents a self-routing switch, 62 represents an output buffer, 621 represents a buffer control circuit, and 622 represents a buffer memory. The switch section shown in FIG. 7 comprises an output-buffer-type ATM switch and all cells simultaneously inputted to the self-routing switch 61 are transferred to an output buffer circuit corresponding to a destination output link in a fixed connection time.

Each output buffer 62 comprises the buffer control circuit. 621 and the buffer memory 622, which temporarily stores inputted cells in the buffer memory 622. The buffer control circuit 621 fetches these cells from the buffer memory 622 one by one whenever the output link becomes idle to transmit them to the output link and moreover monitors the output queuing delay distribution of the cells remaining in the buffer memory 622 to regularly send them to the node management processor 54 through the communication link 55. In this case, for example, an average queuing delay or a rate for queuing delays to exceed a preset threshold value can be used as the queuing delay distribution of the cells to be monitored.

In FIG. 7, a node structure having the output-buffer-type ATM switch is shown for easy understanding. However, other types of switches can be used as long as it is able to monitor the queuing delay of each connection.

Figure 8:
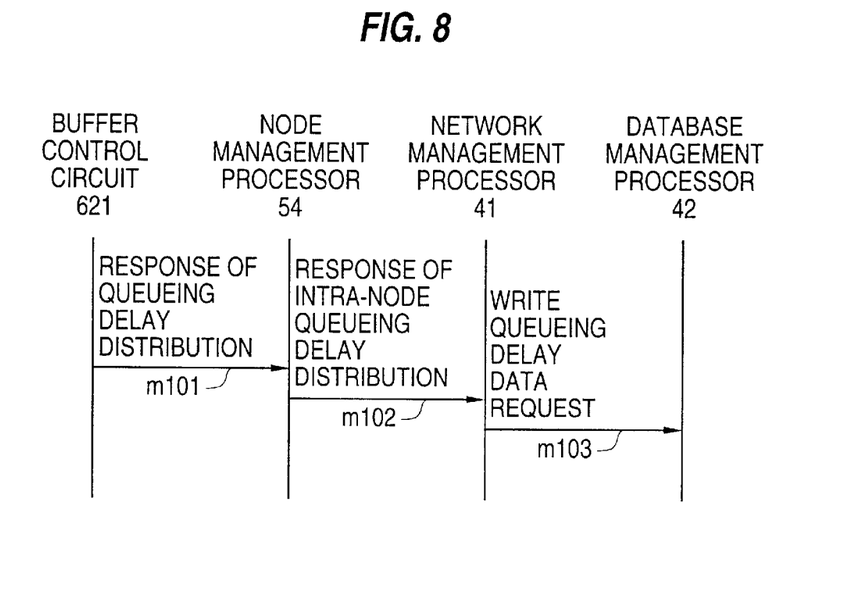
FIG. 8 is an illustration showing the queuing delay response procedure in the second embodiment.

The control operation when the value of a queuing delay distribution sent from an output buffer circuit gets out of a preset range or when an average queuing delay exceeds a preset value is described below by referring to FIG. 8.

When a response of queuing delay distribution message "m101" sent from the buffer control circuit 621 is out of a preset range, the node management processor 54 sends a signal showing occurrence of a trouble and a queuing delay distribution value message "m102" to the network management system 4. As a queuing delay distribution to be sent in this case, an average queuing delay or the maximum first threshold value meeting a condition in which a rate for queuing delays to exceed a preset first threshold value exceeds a separately-set second threshold value is considered.

The value inputted to the network management system 4 from the node management-processor 54 is sent from the network management processor 41 of the network management system 4 to the database management processor 42 as a write queuing delay data request "m103" and stored in the queuing delay database 453 and the each-connection queuing delay database 455.

Figure 9:
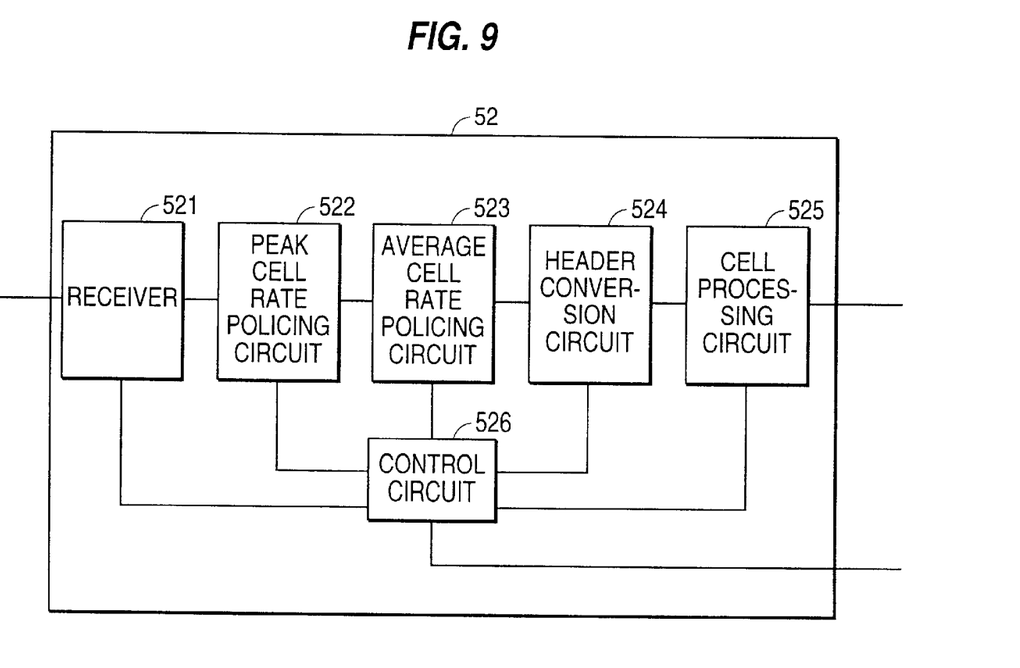
FIG. 9 is a block diagram showing an example of the input interface 52.

FIG. 9 shows an example of the construction of the input IF 52. In FIG. 9, numeral 521 represents a receiver, 522 represents a peek cell rate policing circuit, 523 represents an average cell rate policing circuit, 524 represents a header conversion circuit, 525 represents a cell processing circuit, and 526 represents a control circuit.

The control circuit 526 communicates with the node management processor 54 to decide operation modes of the receiver 521, peak cell rate policing circuit 522, average cell rate policing circuit 523, header conversion circuit 524, and cell processing circuit 525 and monitor operation states. The cell processing circuit 525 inserts and incorporates network management cells.

The receiver 521 extracts cells from the signals outputted to the input IF 52 and the cells are sent to the peak cell rate policing circuit 522 in cells. The peak cell rate policing circuit 522 monitors the peak cell rate of the connection to which a cell belongs whenever a cell arrives and compares the peak cell rate with the policing descriptor decided at the network side in accordance with the peak cell rate declared when the connection is set up. If a violation is detected, the circuit 522 performs cell discarding or violation tagging of the cell.

Cells passing through the peak cell rate policing circuit 522 are sent to the average cell rate policing circuit 523 where the average cell rate of them is monitored. If the average cell rate violates the policing descriptor decided in accordance with a declared traffic descriptor, the regulation processing same as that performed by the peak cell rate policing circuit 522 is performed. Cells passing through the average cell rate policing circuit 523 are sent to the switch section 51 through the header conversion circuit 524 and the cell processing circuit 525.

The average cell rate circuit 523 checks if the average cell rate of the observed arrival cells is kept within a preset range. If not, the circuit 523 sends a signal showing occurrence of a violation of average cell rate and observed value to the control circuit 526. The control circuit 526 receiving the above information sends the same information to the node management processor 54.

Figure 10:
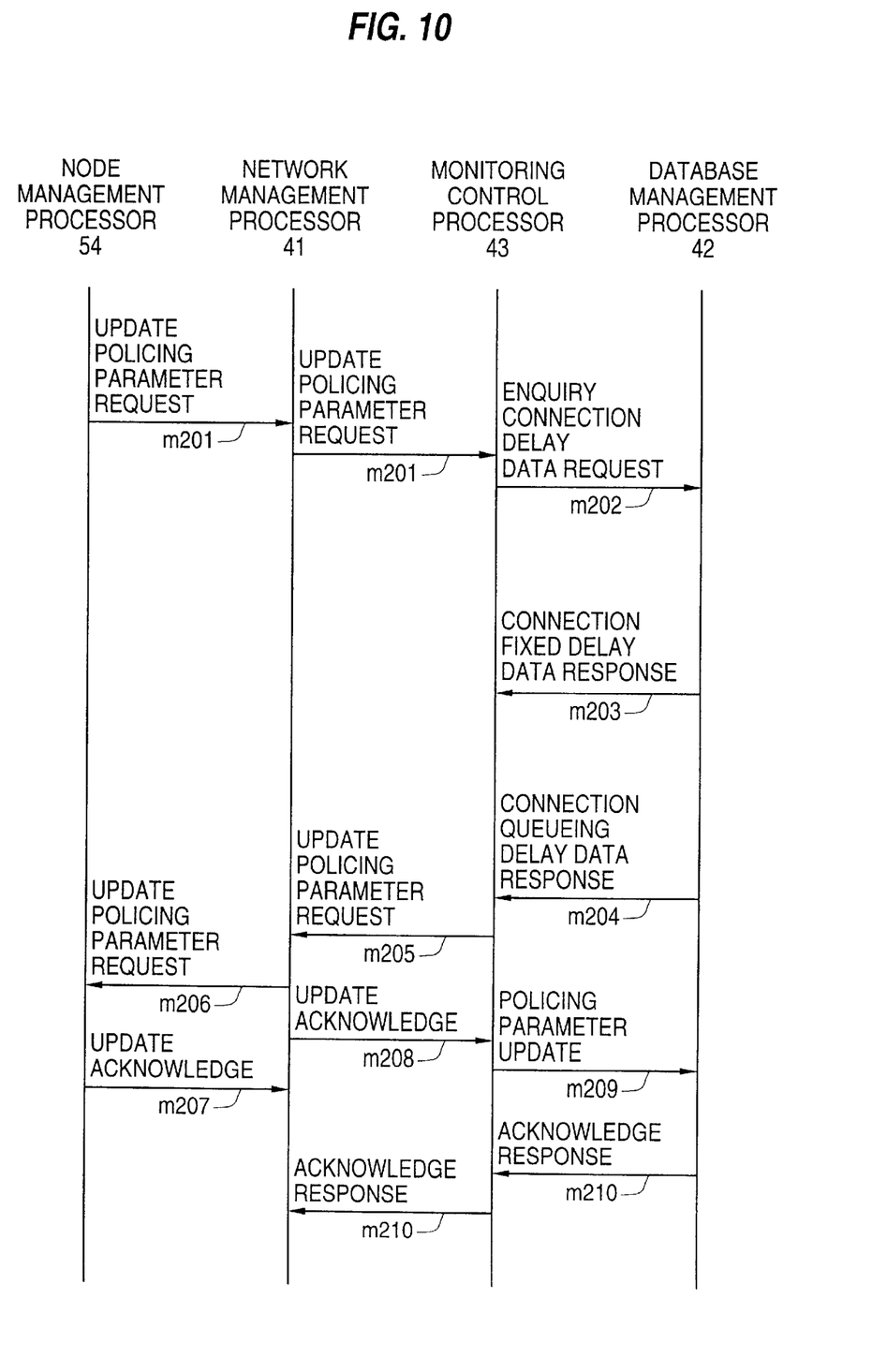
FIG. 10 is an illustration showing the policing parameter update procedure in the second embodiment.

FIG. 10 shows the processing procedure by the node management processor 54 when the processor 54 receives the information about the above violation from the control circuit 526. When the node management processor 54 receives the violation information, it sends an update policing descriptor request message "m201" to the network management system 4. The network management processor 41 of the network management system 4 receiving the update policing descriptor request sends the update request message "m201" to the monitoring control processor 43.

The monitoring control processor 43 outputs an enquiry connection delay data request message "m202" to the database management processor 42. The database management processor 42 receiving the request searches the each-connection fixed delay database 454 and the each-connection queuing delay database 455 and sends a connection fixed delay data response "m203" and the connection queuing delay data response "m204" to the monitoring control processor 43.

The monitoring control processor 43 receiving delay information from the database management processor 42 computes a new average cell rate in accordance with the procedure same as that performed in setting up a connection. When the computed average cell rate is larger than an observed value, the monitoring control processor 43 computes a new policing descriptor in accordance with the technique same as that in setting up a connection.

When the monitoring control processor 43 decides that the quality requested for all the connections already set up can be satisfied by controlling the input traffic by the policing descriptor, it outputs an update policing descriptor request message "m205" to the network management processor 41.

The network management processor 41 outputs an update policing descriptor response message "m206" to the node management processor 54 and an update acknowledge response message "m207" to the monitoring control processor 43. The monitoring control processor 43 receiving the update acknowledge response message "m207" outputs a policing descriptor update request message "m209" to the database management processor 42. The database management processor 42 stores the above updated descriptor value in the each-connection policing descriptor database 456 and thereafter outputs a data storage response message "m210" to the monitoring control processor 43. The monitoring control processor 43 receiving the above data storage response message "m210" outputs the same data storage response message "m210" to the network management processor 41.

When the update response message "m206" of the policing descriptor received from the network management processor 41 designates update, the node management processor 54 which is a request source sends the update designation and its policing descriptor value to the control circuit 526 of the input IF concerned and also sends the update acknowledge message "m207" to the network management processor 41. The control circuit 526 changes the connection policing descriptor values of the average cell rate policing circuit 523 in accordance with a designation given from the node management processor 54.

When the computed new average cell rate is smaller than an observed value, the monitoring control processor 43 sends a response not to update a descriptor to the request-source node management processor 54 because the number of cells causing average cell rate violation increases if directly applying the new average cell rate. Unless the requested quality is satisfied by updating the descriptor, the monitoring control processor 43 sends an update refusal response to the request-source node management processor 54.

The third embodiment of the network management system of the present invention is described below by referring to FIGS. 11 to 13.

Figure 11:
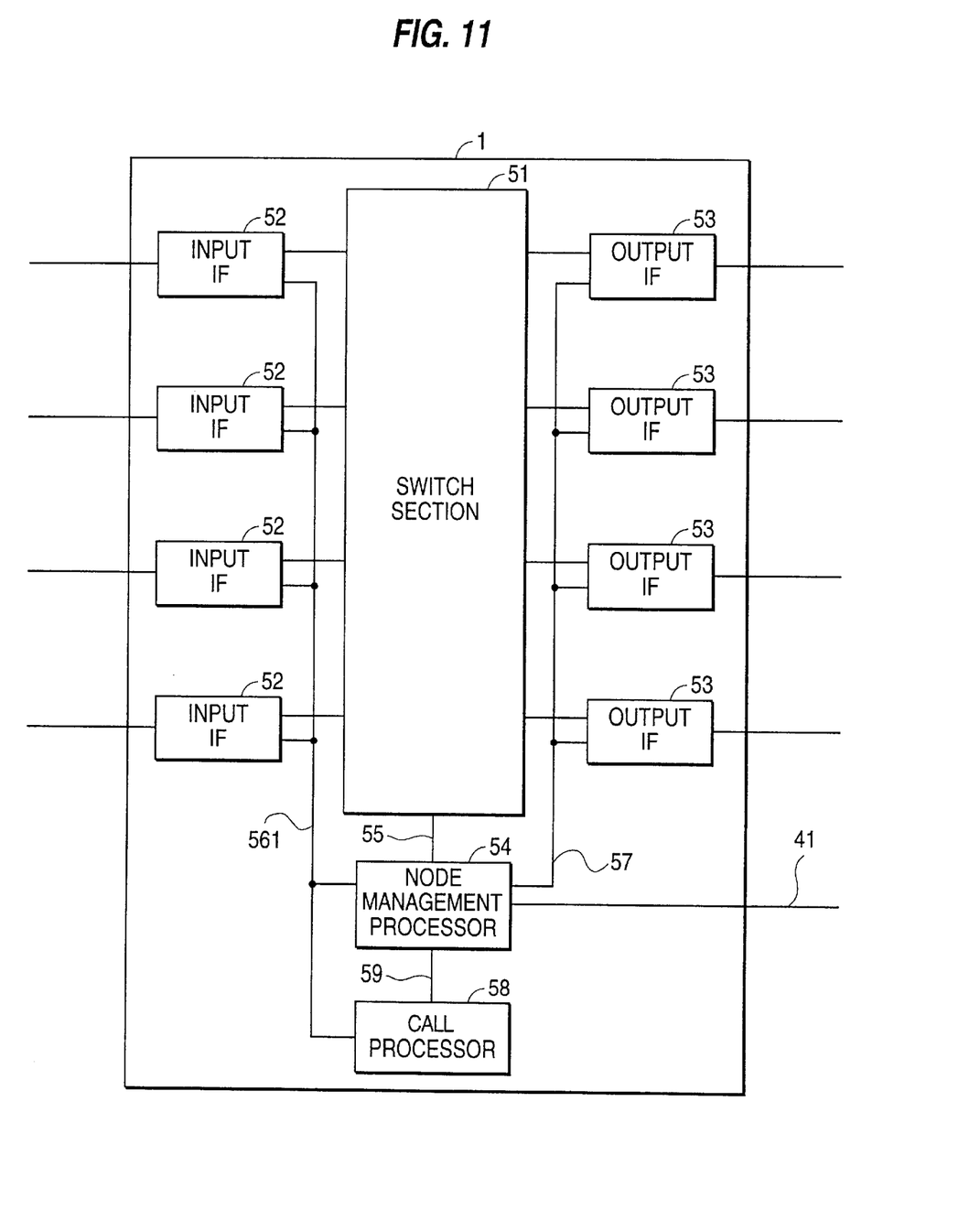
FIG. 11 is a block diagram showing the ATM switching node 1 of the third embodiment of the present invention.

FIG. 11 shows a constitution of the node 1 of this embodiment. In FIG. 11, numeral 51 represents a switch section, 52 represents an input interface (input IF), 53 represents an output interface (output IF), 54 represents a node management processor, and 55 represents a communication link for connecting the switch section 51 and the node management processor 54. Numeral 561 represents a communication link for connecting each input IF 52, the node management processor 54, and a call processor 58, 57 represents a communication link for connecting each output IF 53 and the node management processor 54, 58 represents the call processor, and 59 represents a communication link for connecting the node management processor 54 and the call processor.

Figure 12:
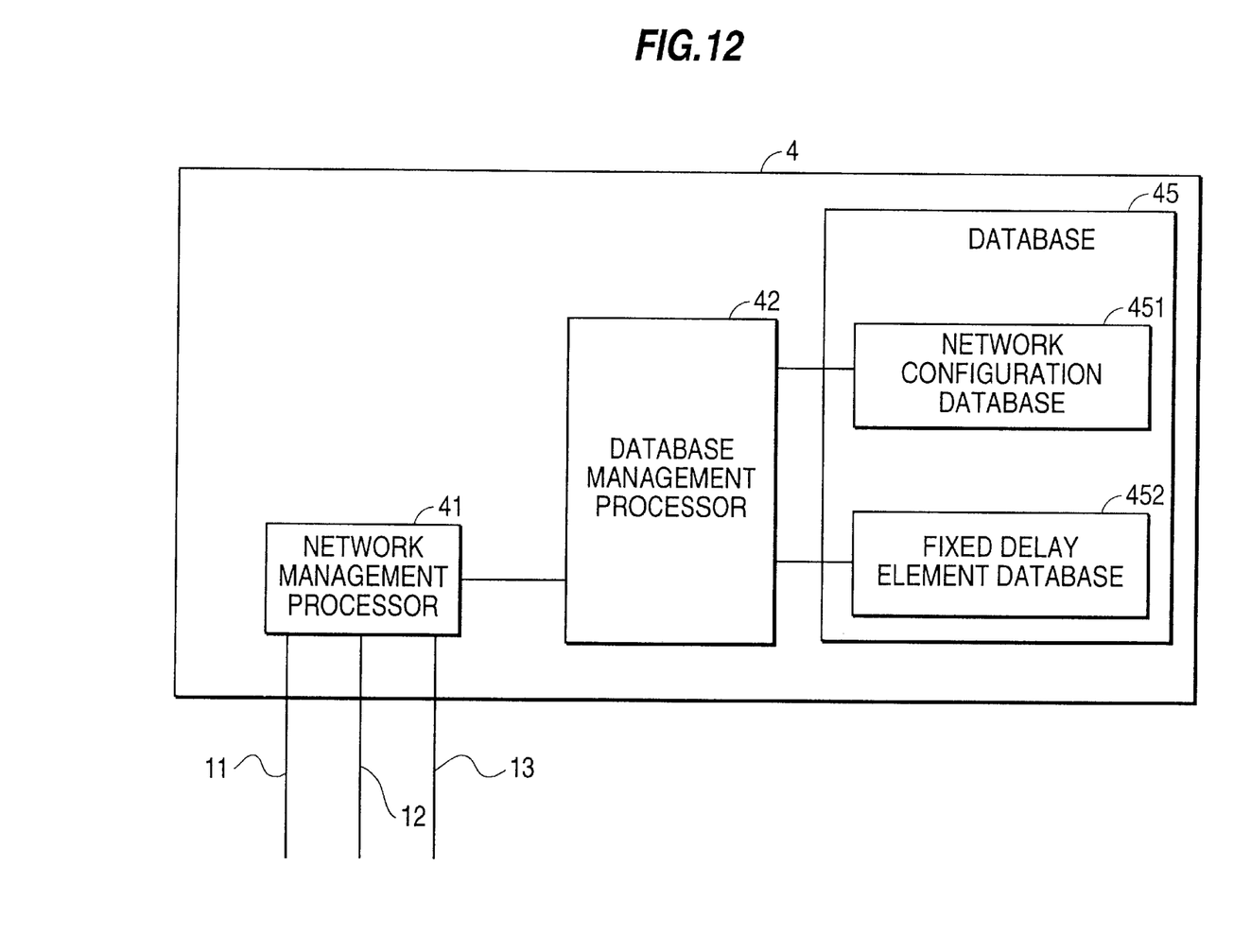
FIG. 12 is a block diagram showing the network management system 4 of the third embodiment.
Figure 13:
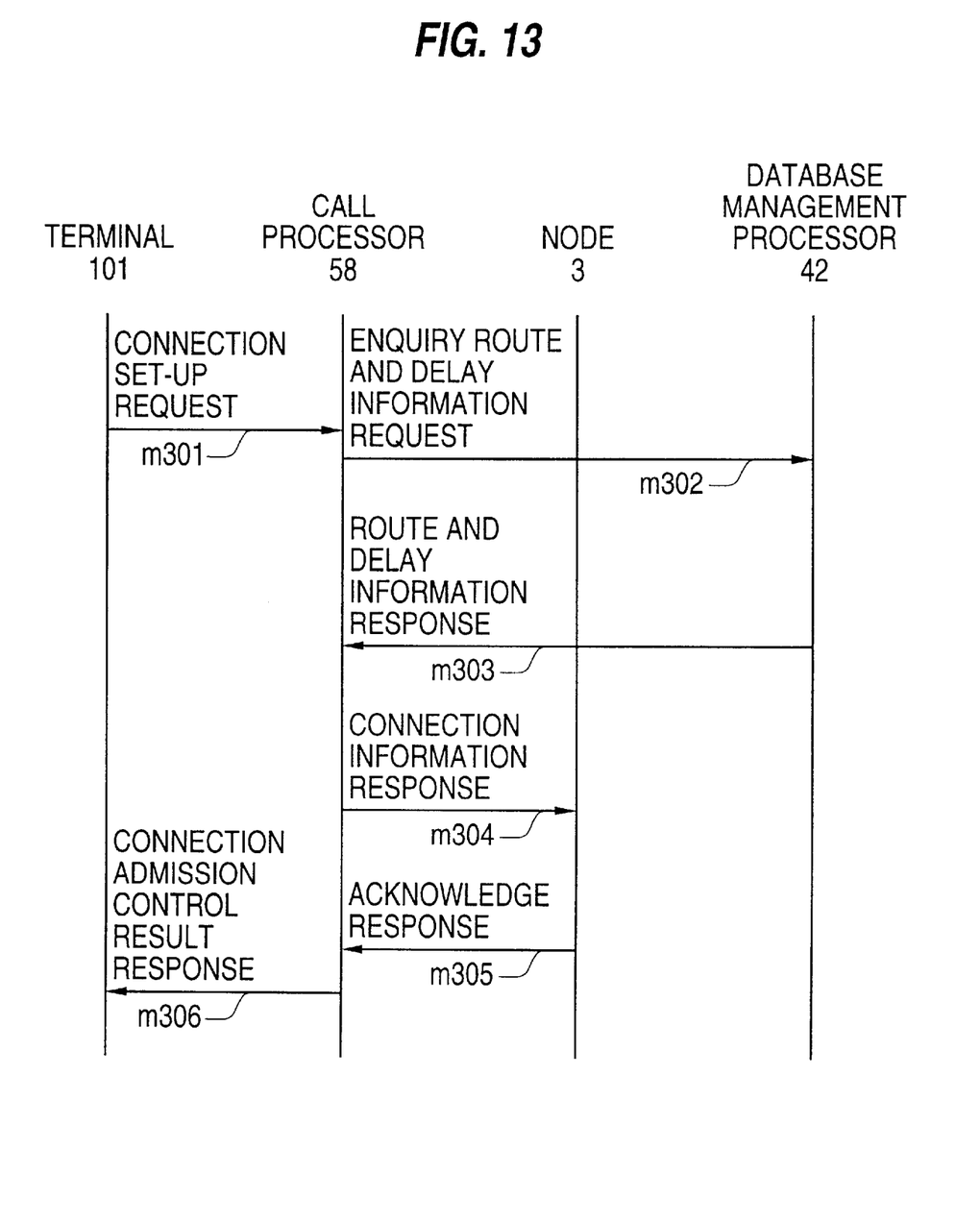
FIG. 13 is an illustration for explaining the connection set-up request acceptance procedure in the third embodiment.

FIG. 12 shows a construction of the network management system 4 of this embodiment. In FIG. 12, numeral 41 represents a network management processor, 42 represents a database management processor, 45 represents a database, 451 represents a network configuration database, and 452 represents a fixed delay element database.

The control procedure by the third embodiment is described below by referring to FIG. 13 and taking a case in setting up the communication connection between the terminals 101 and 103 of the network in FIG. 2 as an example.

A connection set-up request message "m301" sent from the terminal 101 to the node 1 is provided with reception processing by an input IF and thereafter sent to the call processor 58 through the communication link 561.

The call processor 58 has a conversion table showing the relation between type of service, peak cell rate, and maximum data frame length converted into the number of cells. When the processor 58 receives the connection set-up request message "m301" from the terminal 101, it checks the declared type of traffic descriptor. If the declared type of traffic descriptor represents "service specification", the processor 58 refers to the above conversion table to obtain a peak cell rate corresponding to the declared type of service and the maximum data frame length converted into the number of cells and use them as new traffic descriptors. When the type of traffic descriptor represents "descriptor specification", the processor 58 directly uses the declared traffic descriptor. Then, the call processor 58 outputs an enquiry route and delay information request message "m302" to the database management processor 42 through the node management processor 54 and the network management processor 41.

The database management processor 42 receiving the above message "m302" searches for a route for connecting the terminals 101 and 103 in the network configuration database 451 and moreover searches for nodes on each route and link delay information in the fixed delay element database 452, and sends the search results to the call processor 58 as a route and delay information response message "m303" through the network management processor 41 and the node management processor 54.

The call processor 58 computes an estimated value of average cell rate by using the delay information sent from the database management processor 42 and the declared traffic descriptor shown by the connection set-up request message "m301". In this case, for example, the method shown in the first embodiment is used for the estimation of average cell rate.

The call processor 58 selects an acceptable route in the route information sent from the database management processor 42 in accordance with the obtained estimated value of average cell rate and declared peak cell rate. If an acceptable route is present, the processor 58 sends a connection set-up information message "m304" including a value obtained by multiplying the average cell rate by a safety margin as the average cell rate policing descriptor of the connection concerned to each node on the route (node 3 in the case of this embodiment). Moreover, the processor 58 sends the declared maximum cell rate and the estimated value of average cell rate to the input IF 52 connecting with the terminal 101 which is a connection set-up request source.

When the call processor 58 receives a connection information storage response message "m305" from the node 3, it transmits a connection admission control result response message "m306" to the terminal 101 to permit connection set-up. If the processor 58 cannot accept a connection set-up request, it sends a signal showing refusal of connection set-up to the terminal 101.

As described above, the present invention makes it possible to request connection set-up by using a traffic descriptor to be easily declared through a subscriber terminal and improve the utilization efficiency of a network by accurately estimating an average cell rate of each connection at the network side.

While the present invention has been described in detail and pictorially in the accompanying drawings it is not limited to such details since many changes and modifications recognizable to those of ordinary skill in the art may be made to the invention without departing from the spirit and the scope thereof.

I claim:

1. A communication control method at a network management system for managing a network, wherein the network has a plurality of nodes, the network management system is connected to the nodes, has a database for storing network resource information of the network and a table for indicating correspondence between services provided by the network and communication conditions, the network resource information including information indicating a configuration of the network, a source terminal is connected to a first node of the nodes, and a destination terminal is connected to a second node of the nodes, the method comprising the steps of:

receiving from the source terminal a declaration of one of the services for conducting communication between the source terminal and the destination terminal;

determining a communication condition corresponding to the declaration by using the table; and retrieving from the database a route for conducting communication between the source terminal and the destination terminal in accordance with the determined communication condition.

2. A communication control method according to claim 1, further comprising the step of:

directing nodes in the route to establish the route.

3. A network management system for controlling communication, wherein the network management system is connected to a plurality of nodes, and a source terminal is connected to a first node of the nodes, and a destination terminal is connected to a second node of the nodes, the network management system comprising:

a processing unit; and a database for storing network resource information of the network, the network resource information including information indicating a configuration of the network;

a table for indicating correspondence between services provided by the network and communication conditions, wherein the processing unit receives from the source terminal a declaration of one of the services for conducting communication between the source terminal and the destination terminal, determines a communication condition corresponding to the declaration by using the table, and retrieves from the database a route for conducting communication between the source terminal and the destination terminal in accordance with the determined communication condition.

4. A network management system according to claim 3, wherein the processing unit directs nodes in the route to establish the route.

5. A communication method at a network management system for managing a network, wherein the network has a plurality of nodes, the network management system is connected to the nodes and has a table for indicating correspondence between services provided by the network and communication conditions, a source terminal is connected to a first node of the nodes, and a destination terminal is connected to a second node of the nodes, the communication method comprising the steps of:

receiving from the source terminal a declaration of one of the services for conducting communication between the source terminal and the destination terminal;

determining a communication condition corresponding to the designation by using the table; and establishing a route between the first node and the second node in accordance with the determined communication condition.

6. A network management system for controlling communication, wherein the network management system is connected to a plurality of nodes, and a source terminal is connected to a first node of the nodes, and a destination terminal is connected to a second node of the nodes, the network management system comprising:

a processing unit; and a table for indicating correspondence between services provide by the network and communication conditions, wherein the processing unit receives from the source terminal a declaration of one of the services for conducting communication between the source terminal and the destination terminal, determines a communication condition corresponding to the declaration by using the table, and establishes a route between the first node and the second node in accordance with the determined communication condition.

* * * * *